(No Model.)   2 Sheets—Sheet 1.
H. PLUMB.
MACHINE FOR FORMING FERRULE SEATS ON UMBRELLA STICKS.
No. 313,836.  Patented Mar. 10, 1885.
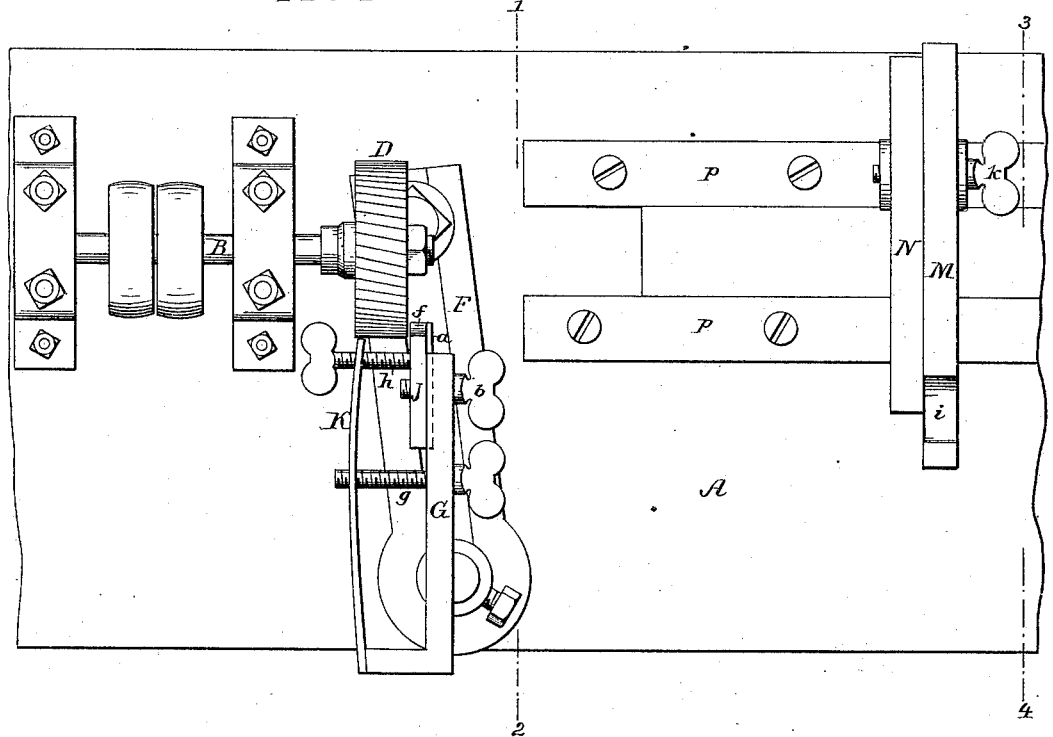
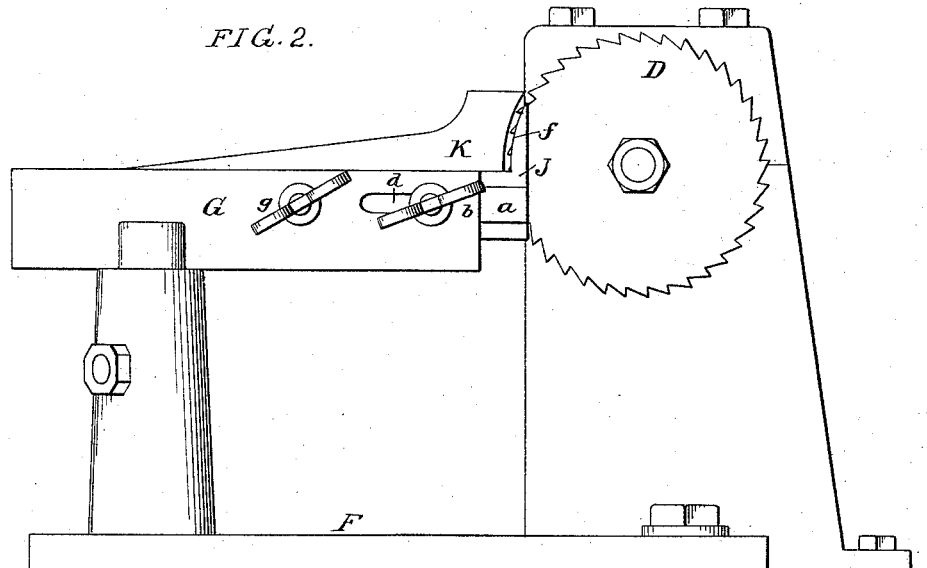
Witnesses
John McClayton
Harry Smith
Inventor
Hiram Plumb
by his attorneys
Howson & Sons (No Model.) 2 Sheets—Sheet 2.

H. PLUMB.
MACHINE FOR FORMING FERRULE SEATS ON UMBRELLA STICKS.

No. 313,836. Patented Mar. 10, 1885.

Witnesses
John M. Clayton
Harry Smith

Inventor
Hiram Plumb
by his attorneys
Howson & Sons

UNITED STATES PATENT OFFICE.

HIRAM PLUMB, OF PHILADELPHIA, PENNSYLVANIA, ASSIGNOR TO WILLIAM A. DROWN & CO., OF SAME PLACE.

MACHINE FOR FORMING FERRULE-SEATS ON UMBRELLA-STICKS.

SPECIFICATION forming part of Letters Patent No. 313,836, dated March 10, 1885.

Application filed November 17, 1884. (No model.)

*To all whom it may concern:*

Be it known that I, HIRAM PLUMB, a citizen of the United States, and a resident of Philadelphia, Pennsylvania, have invented certain Improvements in Machines for Forming Ferrule-Seats on Umbrella-Sticks, &c., of which the following is a specification.

The object of my invention is to construct a machine for rapidly and accurately recessing the sticks of umbrellas or parasols so as to form seats for the reception of ferrules or tip-cup rings; and this object I attain in the manner which I will now proceed to describe, reference being had to the accompanying drawings, in which—

Figure 3:
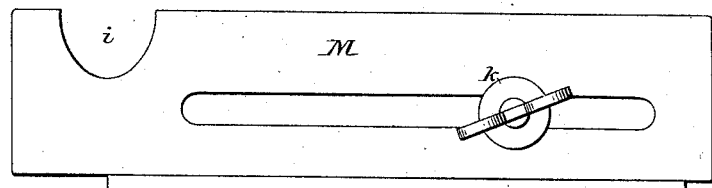
Figure 4:
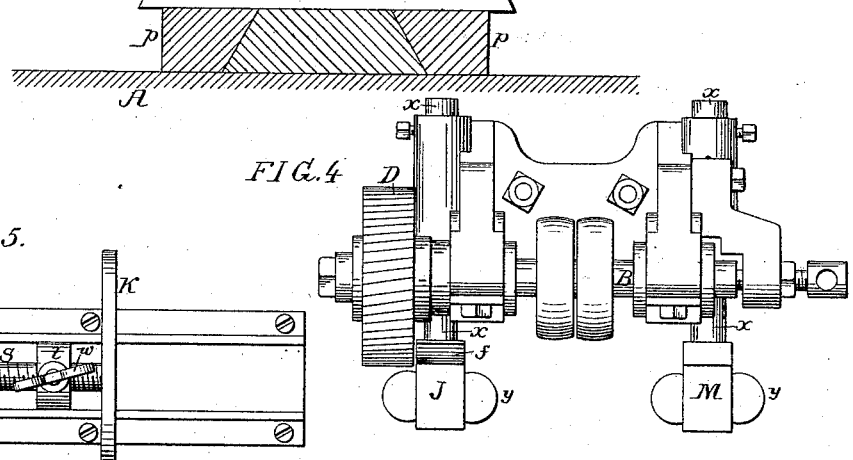
Figure 5:
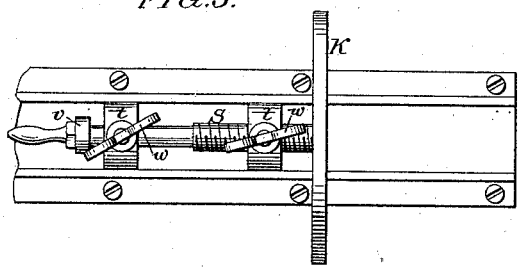
Figure 6:
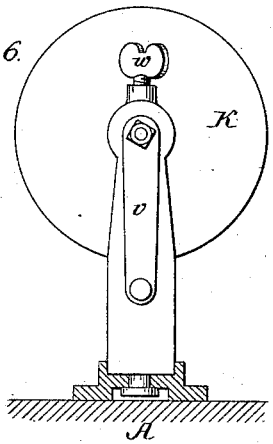
Figure 7:
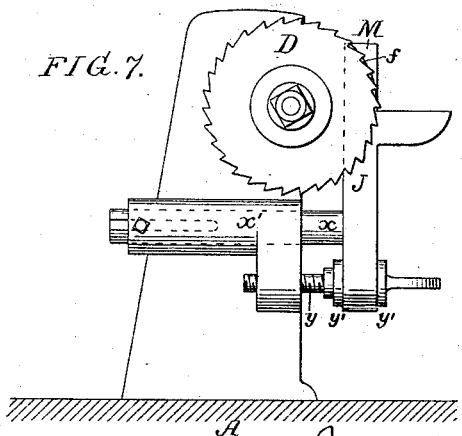

Figure 1, Sheet 1, is a plan view of a machine constructed in accordance with my invention, and intended to reduce the end of an umbrella or parasol stick so as to form a seat for the reception of a ferrule; Fig. 2, a transverse section on the line 1 2, Fig. 1, and on an enlarged scale; Fig. 3, Sheet 2, a transverse section, also enlarged, on the line 3 4, Fig. 1; and Figs. 4, 5, 6, and 7, views of a machine intended for recessing a stick near the handle for the reception of a tip-cup ring.

Referring first to Figs. 1, 2, and 3, A is a bench similar to that of an ordinary wood-turning lathe, and having bearings for a spindle, B, which carries a rotary cutting-disk, D, the teeth of which are preferably inclined, as shown in Fig. 1, so as to give them a shearing effect and prevent the chipping or splitting of the wood upon which the cutter acts. A dog, F, similar to an ordinary lathe-dog, is secured to the bench A, and carries the bar G to a recess, at one end of which is adapted a dovetailed rib, *a*, on a gage, J, the latter being secured to the bar G by means of a thumb-screw, *b*, adapted to a slot, *d*, in said bar. The gage J occupies a position adjacent to the front face of the disk D, and has a curved face, *f*, concentric with the cutting-edges of the teeth, the gage being adjustable toward and from the center of the disk, so as to vary the distance between the curved face of the gage and the cutting-edges of the teeth, and thus regulate the depth of cut of the latter, and the consequent depth of shoulder formed by the recessing of the stick, so as to suit ferrules of different thicknesses. Another gage, K, is secured to the bar G, and is acted upon by set-screws *g h*, so that its free end, which occupies a position close to the cutting-face of the disk D, can be adjusted so as to cover more or less of said cutting-face, this gage serving as a stop for the end of the stick, and thereby determining the length of the recess formed by the cutter. The stick, some distance from the end of the same, rests in notch *i* on a bar, M, which is adjustable laterally across the face of a slide, N, the bar being secured after the adjustment by a thumb-screw, *k*. This adjustment determines the angle of the stick in respect to the face of the cutter, and thereby governs the taper of the reduced portion of the stick. The slide N is adjustable longitudinally in the guides *p* on the bench A, so as to co-operate with the laterally-adjustable bar M, when necessary, in determining the angle of the stick in respect to the cutter.

The object of making the face *f* of the gage J concentric with the cutting-face of the disk D is to insure perfect equidistance of all portions of the said face from the cutting-edges of the teeth, and thus provide a proper gage for the stick, whatever the diameter of the same may be.

The machine shown in Figs. 4 to 7 is intended for recessing the handle portion of the stick at some distance from the end of the same, for the purpose of providing a seat for the ring on which the tip-cup slides, the machine being similar in all material respects to that just described, and consisting of a rotary cutter, D, gage K, shoulder-gage J, and rear gage M. In this case, however, the end gage, K, is carried by a threaded spindle, *s*, adapted to bearings *t*, and operated by a crank-handle, *v*, in order to adjust the disk, the spindle being secured in position after adjustment by means of a thumb-screw, *w*. The gages J and M have spindles *x*, adapted to bearings *x'* on the frame which carries the cutter-spindle, adjustment of the gages being effected by screws *y*, having collars *y'*, bearing upon opposite sides of the shanks of the gages.

I claim as my invention—

1. The combination of a rotary cutter having peripheral cutting-teeth, with a gage, J, adjacent to the side or flat face of the cutter, whereby it serves to regulate the depth of cut of the teeth on a stick presented to the cutter parallel with the axis of the same, as set forth.

2. The combination of a rotary cutter having peripheral cutting-teeth, with a gage, J, having a segmental face, said gage being adjacent to the side of the cutter, as set forth.

3. The combination of a rotary cutter having peripheral cutting-teeth, a gage, K, projecting beyond the periphery of the cutter and serving as a stop for the end of a stick, and a gage, J, adjacent to the side of the cutter and serving to determine the depth of cut of the latter, as set forth.

4. The combination of a rotary cutter having peripheral cutting-teeth, a gage, J, adjacent to the side of the cutter and governing the depth of cut, and a gage, M, located at a distance from the cutter, whereby it serves, in connection with said gage J, to govern the taper of the cut, as set forth.

5. The combination of a rotary cutter having peripheral cutting-teeth, a gage, J, adjacent to the side of the cutter and regulating the depth of cut, and a distant gage, M, adjustable laterally in respect to the axial line of the cutter, as set forth.

In testimony whereof I have signed my name to this specification in the presence of two subscribing witnesses.

HIRAM PLUMB.

Witnesses:
JOHN M. CLAYTON,
HARRY SMITH.